(12) United States Patent
Hahakura et al.

(10) Patent No.: US 10,081,100 B2
(45) Date of Patent: Sep. 25, 2018

(54) ROBOT

(71) Applicant: Seiko Epson Corporation, Tokyo (JP)

(72) Inventors: Seiji Hahakura, Azumino (JP); Daisuke Komatsu, Suwa (JP)

(73) Assignee: Seiko Epson Corporation (JP)

( * ) Notice: Subject to any disclaimer, the term of this patent is extended or adjusted under 35 U.S.C. 154(b) by 320 days.

(21) Appl. No.: 15/010,288

(22) Filed: Jan. 29, 2016

(65) Prior Publication Data
US 2016/0221182 A1 Aug. 4, 2016

(30) Foreign Application Priority Data

Jan. 30, 2015 (JP) .................................. 2015-016564

(51) Int. Cl.
*B25J 9/00* (2006.01)
*B25J 9/04* (2006.01)

(52) U.S. Cl.
CPC ............ *B25J 9/0018* (2013.01); *B25J 9/0009* (2013.01); *B25J 9/044* (2013.01); *Y10S 901/19* (2013.01)

(58) Field of Classification Search
CPC ......... B25J 9/0018; B25J 9/0009; B25J 9/044
See application file for complete search history.

(56) References Cited

U.S. PATENT DOCUMENTS

| 5,031,474 A * | 7/1991 | Keppler | B25J 9/042 74/490.04 |
|---|---|---|---|
| 2013/0145893 A1 | 6/2013 | Kumagai et al. | |
| 2013/0152722 A1* | 6/2013 | Kumagai | B25J 9/0018 74/490.01 |
| 2015/0321344 A1* | 11/2015 | Hahakura | B25J 19/04 74/490.02 |
| 2015/0321345 A1* | 11/2015 | Hahakura | B25J 9/042 74/490.03 |
| 2015/0321361 A1* | 11/2015 | Hahakura | B25J 18/00 74/490.01 |

FOREIGN PATENT DOCUMENTS

WO WO-2012-029174 A1 3/2012

* cited by examiner

*Primary Examiner* — David M Fenstermacher
(74) *Attorney, Agent, or Firm* — Harness, Dickey & Pierce, P.L.C.

(57) ABSTRACT

A robot includes a first member, a second member which is provided on a first member and rotates around a rotation shaft, a driving unit which is provided in the second member, and an operation shaft which is driven by the driving unit and is provided in the second member, the first member includes a first portion and a second portion which has a smaller width than that of the first portion, when seen in a direction orthogonal to a plane including the rotation shaft and the operation shaft, and the second member is connected to the second portion.

9 Claims, 4 Drawing Sheets

ROBOT

BACKGROUND

1. Technical Field

The present invention relates to a robot.

2. Related Art

A ceiling-mounted scalar robot which is installed to be suspended from a ceiling surface as disclosed in WO2012/029174 is known as an example of industrial robots.

Such a scalar robot disclosed in WO2012/029174 includes a base which is fixed to a ceiling surface (base), a first arm which is connected to the base and rotatable in a horizontal plane, a second arm which is linked to the first arm and is rotatable in the horizontal plane, and an operation shaft which is provided on a distal end of the second arm and to which a tool for performing transportation of a workpiece (component) is attached. A motor or a reduction gear for driving the operation shaft is fixed to the second arm of the scalar robot.

However, a miniaturized ceiling-mounted scalar robot is desired in order to save a space, for example. Accordingly, for example, a width of the first arm or a width of the second arm is decreased to decrease the entire width of the robot, in order to achieve the miniaturization of the robot.

However, in the scalar robot disclosed in WO2012/029174, it is difficult to decrease a length of the second arm in order to ensure a region for fixing the motor or the reduction gear in the second arm, due to a structural reason, and thus, it is difficult to realize the miniaturization of the robot.

SUMMARY

An advantage of some aspects of the invention is to provide a robot which can be miniaturized.

The invention can be implemented as the following forms or application examples.

APPLICATION EXAMPLE 1

A robot according to this application example includes: a first member; a second member which is provided on the first member and rotates around a first shaft; a driving unit which is provided in the second member; and an operation shaft which is driven by the driving unit and is provided in the second member, in which the first member includes a first portion and a second portion which has a smaller width than that of the first portion, when seen in a direction orthogonal to a plane including the first shaft and the operation shaft, and the second member is connected to the second portion.

With this configuration, it is possible to decrease a length of the second member (distance between the first shaft and the center shaft of the operation shaft) and accordingly, it is possible to realize miniaturization of the robot.

APPLICATION EXAMPLE 2

In the robot according to the application example, it is preferable that a reinforcement unit which reinforces a connection portion between the second portion and the second member is provided on the connection portion.

With this configuration, it is possible to increase rigidity of the connection portion and to reduce bending or the like of the second member.

APPLICATION EXAMPLE 3

In the robot according to the application example, it is preferable that the reinforcement unit includes at least one rib.

With this configuration, it is possible to further increase rigidity of the connection portion.

APPLICATION EXAMPLE 4

In the robot according to the application example, it is preferable that the second portion has a tubular shape, and the rib is provided on an inner peripheral surface of the second portion.

With this configuration, it is possible to further increase rigidity of the connection portion without damaging an outer shape of the second portion.

APPLICATION EXAMPLE 5

In the robot according to the application example, it is preferable that the rib is provided on a part of the inner peripheral surface of the second portion.

With this configuration, it is possible to further prevent an increase in weight of the second portion and to further increase rigidity of the connection portion.

APPLICATION EXAMPLE 6

In the robot according to the application example, it is preferable that the second portion has a tubular shape, and the rib is provided along a circumferential direction of the second portion.

With this configuration, it is possible to further prevent an increase in weight of the second portion and to further increase rigidity of the connection portion.

APPLICATION EXAMPLE 7

In the robot according to the application example, it is preferable that, when a difference between a width of the first portion and a width of the second portion when seen from a direction orthogonal to a plane including the first shaft and the operation shaft is set as L1 and a protrusion height of the rib is set as L2, a relationship of $0.01 \leq L2/L1 \leq 2.0$ is satisfied.

With this configuration, it is possible to further prevent an increase in weight of the second portion and to further decrease the length of the second member. Therefore, it is possible to further prevent an increase in weight of the robot and to further miniaturize the robot.

APPLICATION EXAMPLE 8

In the robot according to the application example, it is preferable that the first portion and the second portion respectively have a tubular shape, and the second portion is provided eccentrically to a side of the first portion opposite to the driving unit.

With this configuration, it is possible to further prevent a decrease in rigidity of the first member and to further decrease the entire length of the second member.

APPLICATION EXAMPLE 9

In the robot according to the application example, it is preferable that the first member and the second member are integrally formed.

With this configuration, it is possible to further increase mechanical strength of the first member and the second member.

APPLICATION EXAMPLE 10

In the robot according to the application example, it is preferable that the first member and the second member are separately provided.

With this configuration, it is possible to further increase a degree of design freedom of each of the first member and the second member.

APPLICATION EXAMPLE 11

It is preferable that the robot according to the application example is a ceiling-mounted type.

As described above, it is possible to realize miniaturization of the robot, and accordingly, it is possible to provide a ceiling-mounted robot which can be fixed to a certain position so as to realize space saving.

APPLICATION EXAMPLE 12

In the robot according to the application example, it is preferable that the second member rotates in a horizontal direction.

With this configuration, it is possible to provide a small-sized scalar robot having high reliability.

BRIEF DESCRIPTION OF THE DRAWINGS

The invention will be described with reference to the accompanying drawings, wherein like numbers reference like elements.

FIG. 3A is a sectional view and FIG. 3B is a side view.

DESCRIPTION OF EXEMPLARY EMBODIMENTS

Hereinafter, a robot according to the invention will be described in detail with reference to preferred embodiments shown in the accompanied drawings.

Robot

Figure 1:
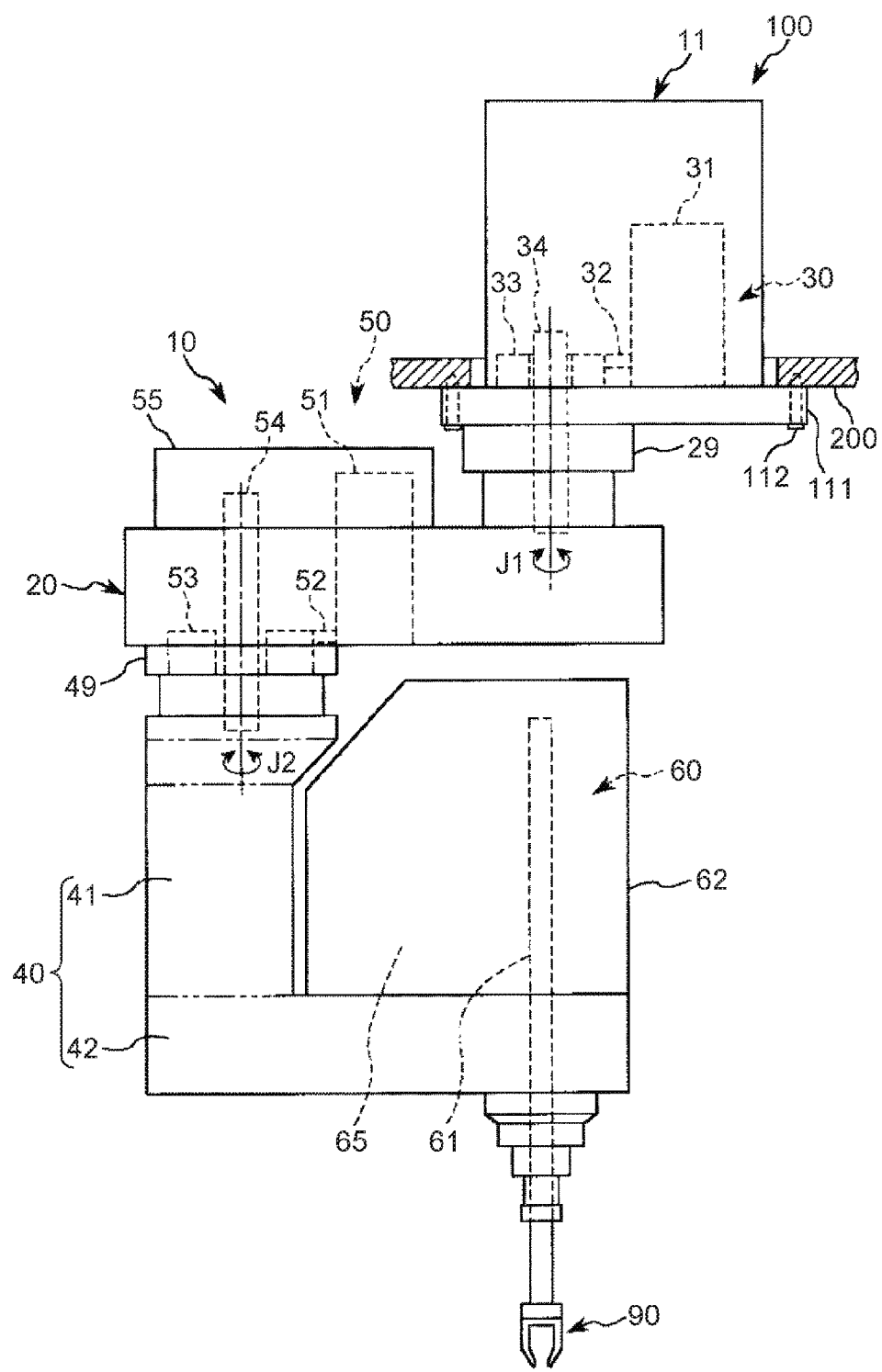
FIG. 1 is a schematic side view showing a robot according to a preferred embodiment of the invention.
Figure 2:
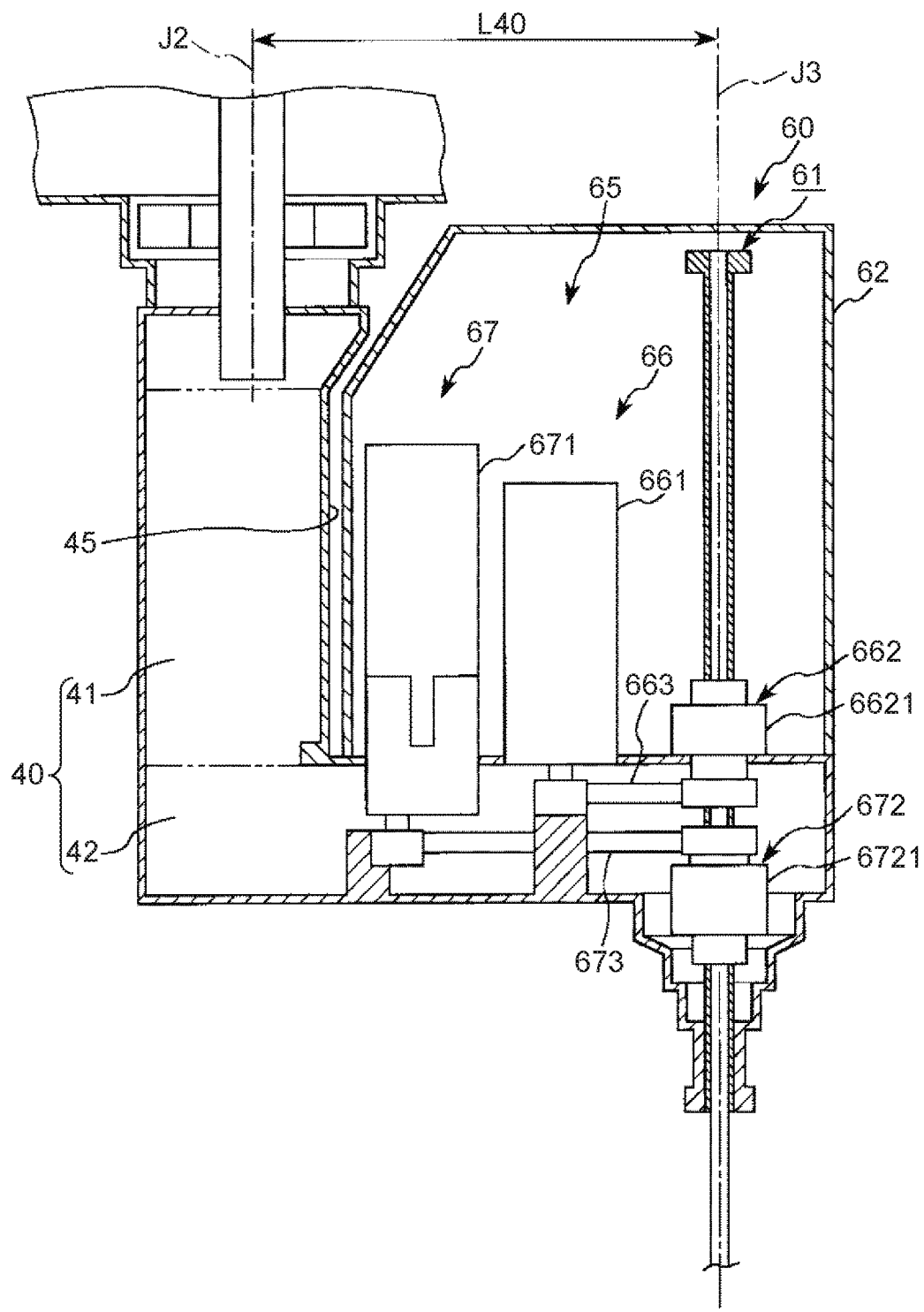
FIG. 2 is a partially enlarged sectional view of the robot shown in FIG. 1.
Figures 3A, 3B:
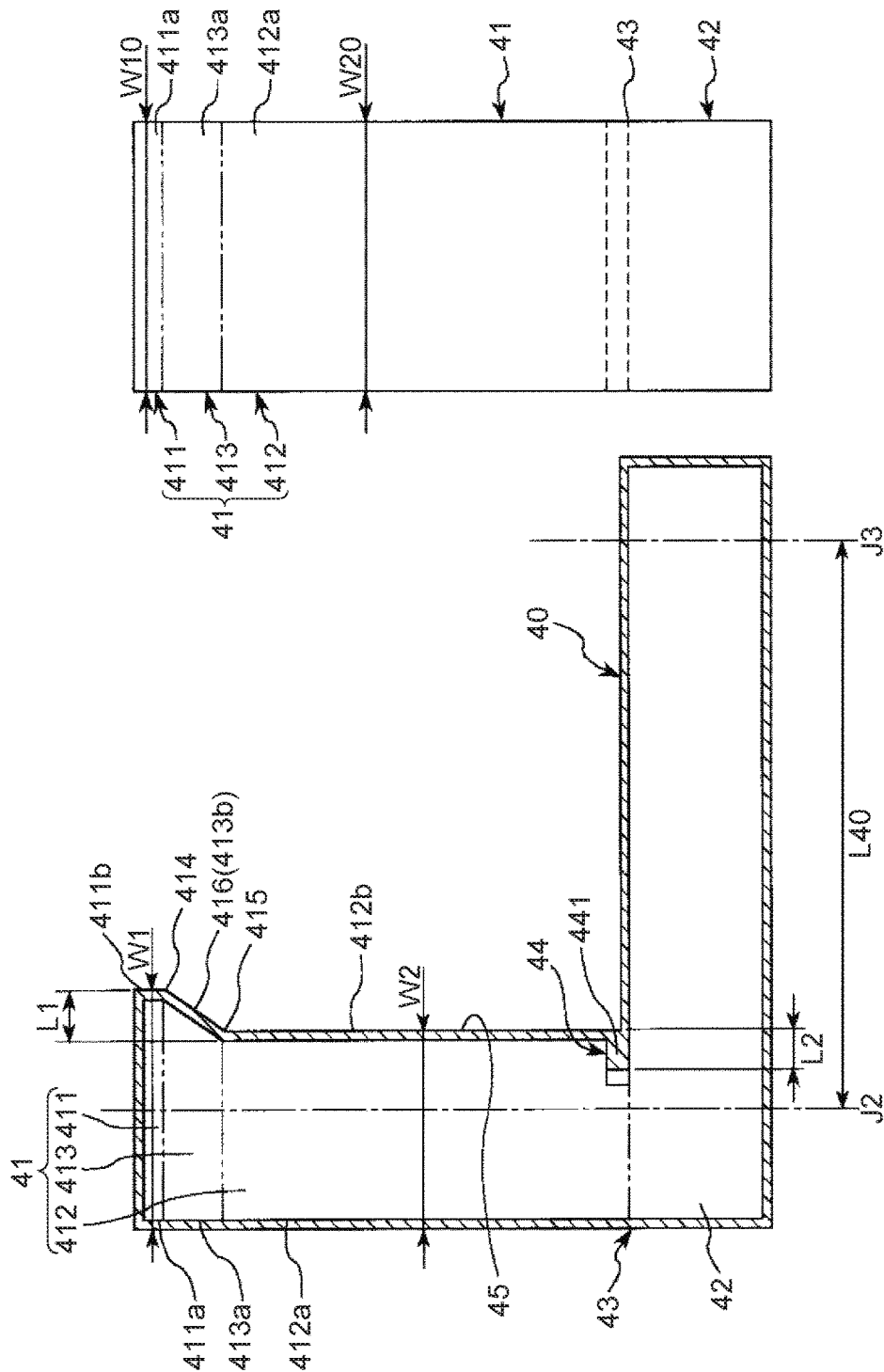
FIGS. 3A and 3B are views showing a second arm of the robot shown in FIG. 1
Figure 4A:
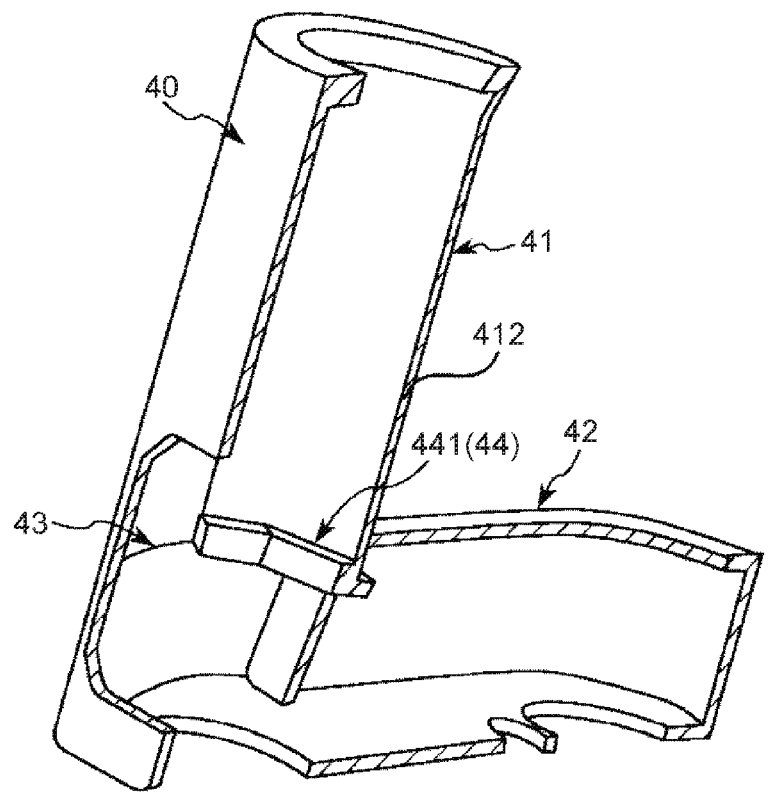
FIGS. 4A and 4B are perspective views showing the second arm of the robot shown in FIG. 1.
Figure 4B:
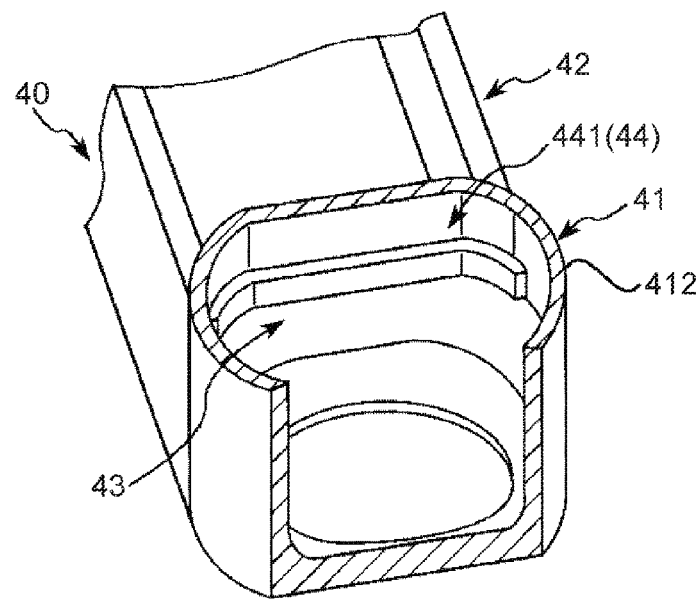

FIG. 1 is a schematic side view showing a robot according to a preferred embodiment of the invention. FIG. 2 is a partially enlarged sectional view of the robot shown in FIG. 1. FIGS. 3A and 3B are views showing a second arm of the robot shown in FIG. 1 and FIG. 3A is a sectional view and FIG. 3B is a side view. FIGS. 4A and 4B are perspective views showing the second arm of the robot shown in FIG. 1. Hereinafter, an upper side in FIG. 1 is referred to as "up", a lower side is referred to as "down", a left side is referred to as "left", and a right side is referred to as "right", for convenience of description. A up-down direction in FIG. 1 is referred to as a "vertical direction" and a right-left direction is referred to as a "horizontal direction".

A robot 100 shown in FIG. 1 is a horizontal articulated robot, a so-called ceiling-mounted scalar robot which is installed to be suspended from an installation surface 200 such as a ceiling surface, for example. The robot 100 is, for example, used in a manufacturing step of manufacturing a precision apparatus such as a mobile phone (smart phone) and can perform grasping or transportation of a precision apparatus or a component.

As shown in FIG. 1, the robot 100 includes a base 11, a robot arm 10 which is connected to the base 11, an operation head 60 which is connected to the robot arm 10, and a robot control device (control unit) (not shown). Hereinafter, each unit configuring the robot 100 will be described in detail.

Base

As shown in FIG. 1, the base 11 is a member which is positioned on the uppermost side of the robot 100 and is attached to the installation surface 200. A plate-shaped flange 111 is connected to the lower portion of the base 11, and in the embodiment, the flange 111 is fixed to the installation surface 200 using a fixing member 112 such as a bolt, for example, to attach the base 11 to the installation surface 200. A method of fixing the base 11 to the installation surface 200 is not limited to a method of performing the fixing using the fixing member 112 described above, and may be any method such as a method of performing the fixing using adhesion, for example.

Robot Arm

As shown in FIG. 1, the robot arm 10 includes a first arm 20 which is extended in the horizontal direction, a first motor unit 30 which is provided in the base 11 and drives the first arm 20, a second arm 40 which is provided on the lower portion of the first arm 20 and has an L shape in a side view, and a second motor unit 50 which is provided in the first arm 20 and drives the second arm 40.

A first joint 29 is provided on one end portion of the first arm 20 and the first arm 20 is supported by the base 11 through the first joint 29 in a cantilever manner. The first joint 29 has a mechanism of rotatably supporting the first arm 20 with respect to the base 11. Accordingly, the first arm 20 can be rotated with respect to the base 11 around a rotation shaft J1 which is substantially parallel to the vertical direction.

The first motor unit 30 is accommodated in the base 11 and includes a first motor 31, a belt 32, a reduction gear 33, and a shaft 34. The shaft 34 extends along the vertical direction and one end thereof is fixed to the first arm 20. In the first motor unit 30, a driving force of the first motor 31 is transmitted to the reduction gear 33 through the belt 32, the shaft 34 rotates by the driving force, the speed of which is reduced by the reduction gear 33, and the first arm 20 is rotated by the rotation of the shaft 34.

A second joint 49 is provided on the upper end portion of the second arm 40 and the second arm 40 is connected to the other end portion of the first arm 20 through the second joint 49. The second arm 40 includes a first member 41 which extends to the lower portion from the second joint 49 in the vertical direction and a second member 42 which extends in the horizontal direction from the end portion of the lower side of the first member 41. In the embodiment, the first member 41 and the second member 42 are integrally formed. The second joint 49 has a mechanism of rotatably supporting the second arm 40 with respect to the first arm 20. Accordingly, the second arm 40 can be rotated with respect to the first arm 20 around a rotation shaft (first shaft) J2 which is substantially parallel to the vertical direction.

The second motor unit 50 is provided in the first arm 20 and includes a second motor 51, a belt 52, a reduction gear 53, and a shaft 54. The shaft 54 extends along the vertical direction and one end thereof is fixed to the second arm 40.

An upper portion of the second motor unit 50 is covered with a cover member 55 which is provided on the first arm 20. In the second motor unit 50, a driving force of the second motor 51 is transmitted to the reduction gear 53 through the belt 52, the shaft 54 rotates by the driving force, the speed of which is reduced by the reduction gear 53, and the second arm 40 is rotated by the rotation of the shaft 54.

In the robot arm 10 having such a configuration, the rotation shaft J1 of the first arm 20 and the rotation shaft J2 of the second arm 40 are deviated in the horizontal direction. Accordingly, it is possible to widen a movable range of the robot arm 10.

Operation Head

As shown in FIG. 1 and FIG. 2, the operation head 60 includes a cylindrical operation shaft 61 which is provided on a distal end of the second arm 40 and a driving unit 65 which is provided in the upper portion of the second member 42 and between the operation shaft 61 and the first member 41. Some portions of the operation shaft 61 and the driving unit 65 are covered with a cover member 62 which is provided on the second member 42 of the second arm 40.

The operation shaft 61 is provided along the vertical direction and a distal end portion (lower end portion) thereof is protruded from the second arm 40. As shown in FIG. 1, an end effector such as a hand 90 which grasps a precision apparatus or a component, for example, is detachably attached to the protruded distal end portion.

As shown in FIG. 2, the driving unit 65 includes a shaft lifting mechanism 66 which lifts the operation shaft 61 up and a shaft rotation mechanism 67 which rotates the operation shaft 61.

The shaft lifting mechanism 66 includes a shaft lifting motor 661, a lead screw mechanism 662, and a belt 663. The lead screw mechanism 662 is configured with a ball screw including a screw groove (not shown) which is formed on an outer peripheral surface of the operation shaft 61 and a female screw block 6621 which is rotatably supported on the upper portion of the second member 42. In such a shaft lifting mechanism 66, a driving force of the shaft lifting motor 661 is transmitted to the female screw block 6621 through the belt 663 and accordingly the female screw block 6621 is rotated to lift the operation shaft 61 up in the vertical direction.

The shaft rotation mechanism 67 includes a shaft rotation motor 671, a spline mechanism 672, and a belt 673. The spline mechanism 672 is configured with a ball spline including a spline groove (not shown) which is formed on the outer peripheral surface of the operation shaft 61 and a boss block 6721 which is rotatably supported on the lower portion of the second member 42. The spline mechanism 672 supports the operation shaft 61 to be slidable in the vertical direction. In such a shaft rotation mechanism 67, a driving force of the shaft rotation motor 671 is transmitted to the boss block 6721 through the belt 673 and the boss block 6721 is rotated to rotate the operation shaft 61.

In the robot 100 having such a configuration, the first motor unit 30, the second motor unit 50, and the driving unit 65 are connected to the robot control device (not shown) which integrally controls each unit of the robot 100 through wirings (not shown), respectively. The robot control device may be embedded in the base 11 or the robot arm 10 or may be provided as a separate body from the base 11 and the robot arm 10.

Hereinabove, the configuration of the robot 100 has been briefly described. In the above description, the base 11 is attached to the installation surface 200 by the flange 111, but a portion of the installation surface 200 to which the base 11 is attached is not limited thereto, and the upper portion of the base 11 may be attached to the installation surface 200, for example.

In the robot 100 having such a configuration, a length (distance between the rotation shaft J2 and a center shaft J3 of the operation shaft 61) L40 of the second arm 40 is decreased to realize miniaturization of the robot 100. Hereinafter, this point will be described.

The second arm 40 includes the first member 41 and the second member 42 as described above.

As shown in FIG. 3A, the first member 41 includes a wide portion (first portion) 411 which is connected to the second joint 49, a narrow portion (second portion) 412 which is connected to the second member 42, and an intermediate portion 413 which is provided between the wide portion 411 and a narrow portion 412. The wide portion 411, the intermediate portion 413, and the narrow portion 412 are integrally formed. A length of the narrow portion 412 in the vertical direction is formed to be greater than a length of the wide portion 411 in the vertical direction and the wide portion 411 is positioned on the upper portion with respect to the driving unit 65. The wide portion 411 and the narrow portion 412 respectively have a tubular shape in which a cross-sectional area is substantially constant. Meanwhile, the intermediate portion 413 has a tubular portion in which a cross-sectional area is gradually decreased from the wide portion 411 towards the narrow portion 412.

As shown in FIG. 3A, a width W2 of the narrow portion 412 is smaller than a width W1 of the wide portion 411 in a side view (when seen in a direction orthogonal to the plane including the rotation shaft J2 and the operation shaft 61). Meanwhile, as shown in FIG. 3B, a width W20 of the narrow portion 412 is substantially the same as a width W10 of the wide portion 411 when seen from the left side of FIG. 3A (when seen in a direction in which the rotation shaft J2 and the operation shaft 61 are overlapped).

The narrow portion 412 is provided eccentrically to a side of the wide portion 411 opposite to the operation head 60. Accordingly, an outer peripheral surface 411a of the wide portion 411 on a side opposite to the operation head 60, an outer peripheral surface 413a of the intermediate portion 413 on a side opposite to the operation head 60, and an outer peripheral surface 412a of the narrow portion 412 on a side opposite to the operation head 60 are positioned substantially on the same plane. Meanwhile, an outer peripheral surface 412b of the narrow portion 412 on a side of the operation head 60 is positioned on a side of an outer peripheral surface 411b of the wide portion 411 on a side of the operation head 60, opposite to the operation head 60. An outer peripheral surface 413b of the intermediate portion 413 on a side of the operation head 60 configures an inclination surface 416 which is a level difference portion between the outer peripheral surface 411b and the outer peripheral surface 412b. The inclination surface 416 is inclined with respect to the rotation shaft J2. Specifically, the inclination surface 416 is inclined so that a boundary 415 between the outer peripheral surface 412b and the inclination surface 416 is positioned on the rotation shaft J2 side with respect to a boundary 414 between the outer peripheral surface 411b and the inclination surface 416.

When the first member 41 is provided, a recess 45 is formed on the first member 41 on the side of the operation head 60 using upper surfaces of the inclination surface 416, the outer peripheral surface 412b, and the second member 42. As shown in FIG. 2, a part of the operation head 60 is disposed in the recess 45. Accordingly, while ensuring a region for disposing the operation head 60 in the second member 42 of the second arm 40, it is possible to dispose the operation head 60 to be close to the first member 41 by an area of the recess 45. Therefore, it is possible to decrease the length L40 of the second arm 40 and it is possible to miniaturize the second arm 40. Thus, it is possible to realize miniaturization of the robot 100.

In the embodiment, by providing the recess 45 only in the first member 41 on a side of the operation head 60 and omitting to provide a recess in the first member 41 on a side opposite to the operation head 60, the length L40 is decreased and the width of the narrow portion 412 is prevented from being excessively narrowed. Accordingly, it is possible to further prevent a decrease in rigidity of the second arm 40 due to a decrease in a width of the narrow portion 412 and to realize miniaturization of the second arm 40.

The width of the entire first member 41 is not decreased, but the width W2 of the narrow portion 412 is only decreased and the width W1 of the wide portion 411 is set to be greater than the width W2 of the narrow portion 412. Accordingly, it is possible to set the width of the wide portion 411 as a size corresponding to the width of the second joint 49 to be connected to the wide portion 411. Therefore, it is possible to prevent a decrease in rigidity of the connection portion between the second arm 40 and the second joint 49.

From such a viewpoint, the width W1 of the wide portion 411 and the width W2 of the narrow portion 412 preferably satisfy a relationship of $0.4 \leq W2/W1 < 1.0$, more preferably satisfy a relationship of $0.6 \leq W2/W1 \leq 0.99$, and even more preferably satisfy a relationship of $0.95 \leq W2/W1 \leq 0.98$. Accordingly, it is possible to further prevent a decrease in rigidity of the first member 41 and to further decrease the length L40 of the second arm 40. Therefore, it is possible to more stably drive the robot 100 and to further miniaturize the robot.

Specifically, the width W1 of the wide portion 411 is not particularly limited, but is preferably from 20 mm to 100 mm and more preferably from 30 mm to 85 mm. The width W2 of the narrow portion 412 is not particularly limited, but is preferably from 10 mm to 80 mm and more preferably from 20 mm to 75 mm. Accordingly, it is possible to more significantly exhibit the effects described above.

As shown in FIG. 3A, a reinforcement unit 44 which reinforces a boundary portion 43 is provided on the boundary portion 43 (connection portion) which is a boundary between the first member 41 and the second member 42.

As shown in FIG. 4A, the reinforcement unit 44 includes a rib 441 which is formed to be protruded to the inner peripheral surface of the narrow portion 412. As shown in FIG. 4B, the rib 441 is not provided over the entire periphery of the inner peripheral surface of the narrow portion 412 but provided only on a part thereof. Specifically, the rib 441 is provided on a side of the second member 42 in a protrusion direction among the inner peripheral surface of the narrow portion 412. The rib 441 extends along a circumferential direction of the inner peripheral surface of the narrow portion 412, which is a so-called horizontal rib.

Since the rib 441 is provided in the boundary portion 43, it is possible to increase rigidity of the boundary portion 43 between the first member 41 and the second member 42. Accordingly, it is possible to prevent that the boundary portion 43, to which stress is easily concentrated, cannot withstand the stress and the second member 42 is bent.

Particularly, as described above, the rib 441 is provided on the inner peripheral surface of the narrow portion 412. Accordingly, it is possible to further increase rigidity of the boundary portion 43 without breaking an outer shape of the narrow portion 412.

As described above, the rib 441 is not provided on the entire periphery of the inner peripheral surface of the narrow portion 412, but is provided only on a side of the second member 42 in a protrusion direction, to which stress is easily concentrated, among the inner peripheral surface. Accordingly, it is possible to further mainly reinforce a portion to which stress is easily concentrated by the rib 441, without excessively increase a size of the rib 441. Therefore, it is possible to further prevent an increase in weight of the second arm 40 and to further increase rigidity of the boundary portion 43.

As described above, the rib 441 is provided along a circumferential direction of the narrow portion 412. Accordingly, compared to a case of a so-called vertical rib which extends along an axial direction of the narrow portion 412, it is possible to reinforce more mainly the portion to which stress is easily concentrated, in an appropriate manner, and to further prevent an increase in weight of the second arm 40 due to the rib 441 having an excessive size.

From such a viewpoint, as shown in FIG. 3A, when a difference between the width W2 of the narrow portion 412 and the width W1 of the wide portion 411 is set as L1 and a protrusion height of the rib 441 is set as L2, it is preferable to satisfy a relationship of $0.01 \leq L2/L1 \leq 2.0$, it is more preferable to satisfy a relationship of $0.03 \leq L2/L1 \leq 1.5$, and it is even more preferable to satisfy a relationship of $0.03 \leq L2/L1 \leq 1.3$. Accordingly, it is possible to further prevent an increase in weight of the second arm 40 and to further realize miniaturization of the second arm 40. Therefore, it is possible to further prevent an increase in weight of the robot 100 and to further realize miniaturization of the robot 100.

Specifically, the difference L1 is not particularly limited, but is preferably from 0.1 mm to 40 mm and more preferably from 0.3 mm to 30 mm. The protrusion height L2 is not particularly limited, but is preferably from 0.05 mm to 30 mm and more preferably from 0.3 mm to 20 mm. Therefore, it is possible to more significantly exhibit the effects described above.

In the robot 100 having such a configuration, the length (distance between the rotation shaft J2 and the center shaft J3 of the operation shaft 61) L40 of the second arm 40 is not particularly limited and can be set to be from 150 mm to 200 mm, for example.

As described above, in the robot 100, the first member 41 and the second member 42 are integrally formed. Accordingly, compared to a case where the first member 41 and the second member 42 are separately configured, it is possible to increase mechanical strength of the boundary portion 43 thereof. Therefore, it is possible to reduce bending or the like of the second member 42.

In the embodiment, the first member 41 and the second member 42 are integrally formed but may be separately provided. By setting the members separately, it is possible to further increase a degree of design freedom of each of the first member 41 and the second member 42. The first member 41 and the second member 42, respectively, can be configured with different materials suitable for the purpose.

Hereinabove, the robot according to the invention has been described based on the preferred embodiment shown in the drawings, but the invention is not limited thereto, and the configuration of each unit can be replaced with an arbitrary configuration having the same function. In addition, other arbitrary constituent elements may be added.

For example, in the embodiment described above, the reinforcement unit includes one rib, but the number of ribs is not limited thereto and the reinforcement unit may include a plurality of ribs. When the plurality of ribs are provided, a plurality of vertical ribs provided at predetermined intervals may be provided on the upper portion of a so-called horizontal rib shown in FIGS. 3A and 3B, for example.

In the embodiment described above, the second arm has a configuration in which the second member is connected to a lower end of the first member, but the second arm may have a configuration in which the second member is connected to a side surface of the first member.

In the embodiment described above, a first portion is set as the wide portion and a second portion is set as the narrow portion, but the first portion may be the wide portion and the intermediate portion and the second portion may be the narrow portion. If necessary, the wide portion may be omitted and, in this case, the first portion may be the intermediate portion and the second portion may be the narrow portion. When the first portion is the intermediate portion, the width W1 is a maximum width of the intermediate portion.

In the embodiment described above, the outer peripheral surface of the intermediate portion is configured with an inclination surface, but the configuration of the outer peripheral surface of the intermediate portion is not limited thereto. The outer peripheral surface of the intermediate portion may form a stepwise shape having a plurality of steps.

In the embodiment described above, the installation position of the robot according to the invention is a ceiling surface, but the installation position of the robot according to the invention is not limited thereto and may be an arbitrary position such as a ground surface or a side wall surface, for example.

In the embodiment described above, the number of robot arms is one, but the number of robot arms is not limited thereto and may be two or more, for example. That is, the robot according to the invention may be a multi-arm robot such as a double arm robot, for example.

In the embodiment described above, the number of arms included in the robot arm is two, but the number of arms is not limited thereto and may be three or more, for example. In the embodiment described above, the number of rotation shafts of the robot arm is two, but the number of rotation shafts is not limited thereto and may be one or three or more, for example.

In the embodiment described above, the ceiling-mounted horizontal articulated robot has been described as an example of the robot according to the invention, but the robot according to the invention may be a robot having other systems. A leg-type walking (traveling) robot having legs is exemplified as a specific example.

The entire disclosure of Japanese Patent Application No. 2015-016564, filed Jan. 30, 2015 is expressly incorporated by reference herein.

What is claimed is:

1. A robot comprising:
a first member;
a second member which is provided on the first member and rotates around a first shaft;
a driving unit which is provided in the second member; and
an operation shaft which is driven by the driving unit and is provided in the second member,
wherein the first member includes a first portion and a second portion which has a smaller width than that of the first portion, when seen in a direction orthogonal to a plane including the first shaft and the operation shaft,
the second member is connected to the second portion,
a reinforcement unit which reinforces a connection portion between the second portion and the second member is provided on the connection portion,
the reinforcement unit includes at least one rib, and
when a difference between a width of the first portion and a width of the second portion, when seen from a direction orthogonal to a plane including the first shaft and the operation shaft, is set as L1 and a protrusion height of the rib is set as L2, a relationship of $0.01 \leq L2/L1 \leq 2.0$ is satisfied.

2. The robot according to claim 1,
wherein the second portion has a tubular shape, and
the rib is provided on an inner peripheral surface of the second portion.

3. The robot according to claim 2,
wherein the rib is provided on a part of the inner peripheral surface of the second portion.

4. The robot according to claim 1,
wherein the second portion has a tubular shape, and
the rib is provided along a circumferential direction of the second portion.

5. The robot according to claim 1,
wherein the first portion and the second portion respectively have a tubular shape, and
the second portion is provided eccentrically to a side of the first portion opposite to the driving unit.

6. The robot according to claim 1,
wherein the first member and the second member are integrally formed.

7. The robot according to claim 1,
wherein the first member and the second member are separately provided.

8. The robot according to claim 1 is a ceiling-mounted type robot.

9. The robot according to claim 1,
wherein the second member rotates about a vertical axis through the first shaft.

* * * * *